United States Patent Office 2,805,680
Patented Sept. 10, 1957

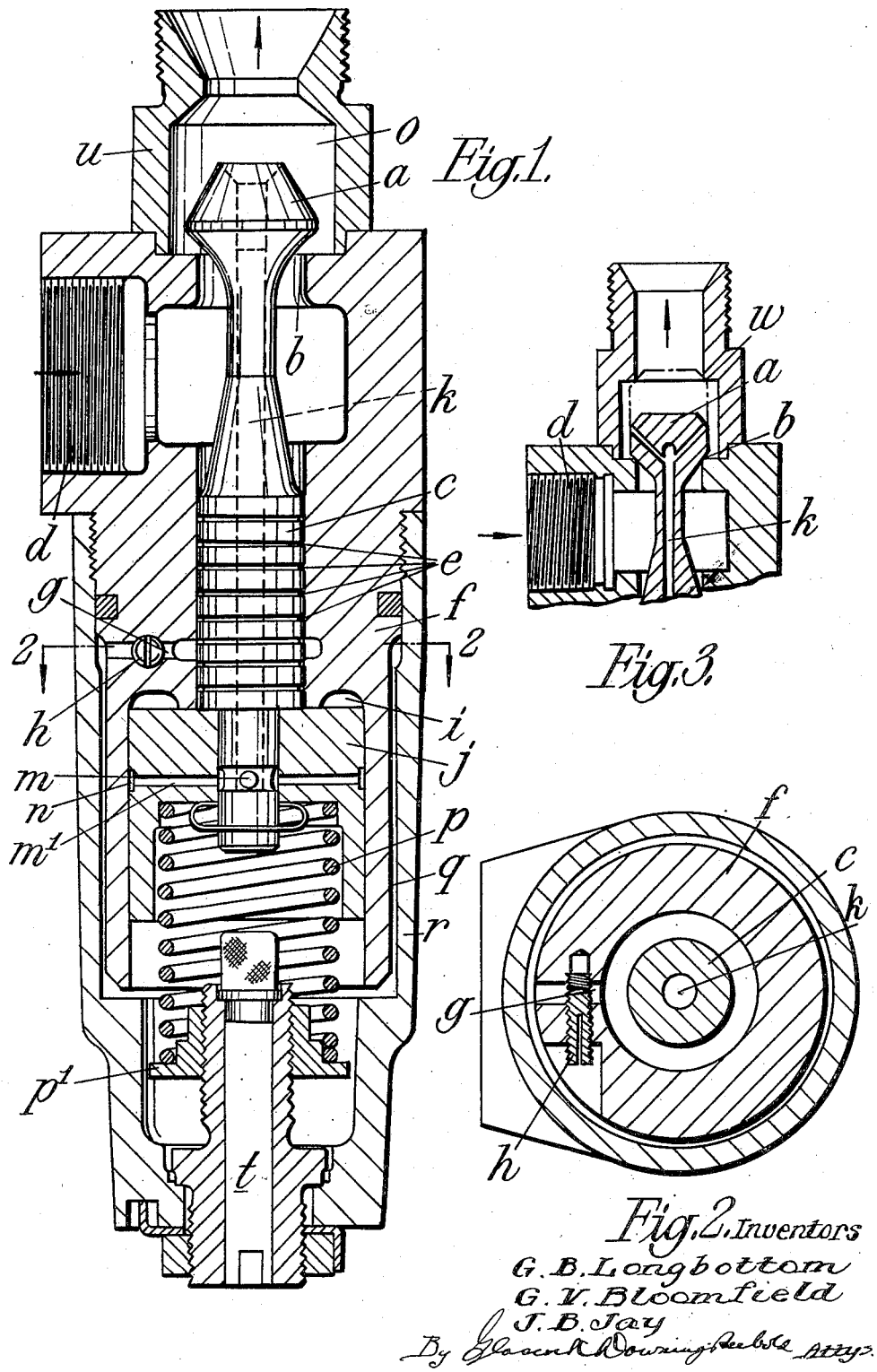

2,805,680

PRESSURE REDUCING VALVES

Geoffrey Brian Longbottom, George Vincent Bloomfield, and James Bertram Jay, Redditch, England, assignors to The Chloride Electrical Storage Company Limited, Clifton Junction, near Manchester, England, a British company Application April 5, 1954, Serial No. 421,081

5 Claims. (Cl. 137—464)

This invention relates to pressure reducing valves principally intended for use in compressed air equipment on aircraft where it is necessary to control the outlet pressure with a close tolerance, independent of supply conditions and rate of flow through the valve. The valve may receive air of a wide range of temperatures and pressures.

The invention consists in a pressure reducing valve comprising a poppet valve balanced under static conditions due to the diameter of the valve seat being equal to the diameter of a portion of the valve stem and the valve inlet branch delivering between the valve seat and the said portion of the valve stem which has a series of annular grooves therearound where it moves in the valve housing to limit leakage flow along the stem, there being a leakage hole and passage (with a screw to adjust the cross sectional area of the passage) extending from the stem through the housing to an atmospheric outlet to allow a part of the leakage to escape, the remainder passing along the stem to the upper end of a control cylinder containing a piston on the valve stem and tending to move the valve against spring pressure in a direction to close it, there being a hole longitudinally through the valve stem from its outlet pressure end to radial holes opening into an annular recess around the aforesaid piston nearer its upper end so that a pressure which bears a relationship to the outlet pressure gains access via said longitudinal hole and radial holes, annular recess and clearance between piston and cylinder to the control cylinder above the piston to tend to close the valve.

The invention further comprises the aforesaid pressure reducing valve in which a shroud is provided around the valve head beyond its seat so that a restriction of flow between valve head and shroud occurs producing a differential pressure across the valve head tending to open the valve. The shroud also determines the relation between the outlet pressure and the pressure which gains access to the control cylinder.

The invention further comprises the aforesaid pressure reducing valve in which the valve head is double acting and can seat on seats both above and below it, the entrance to the hole longitudinally through the valve stem being below the upper seat when the valve closes thereon and in communication upon such closure with the pressure in the air inlet branch of the valve.

Referring to the accompanying explanatory drawings:

Figure 1 is a sectional elevation and Figure 2 a sectional plan on the line 2—2 of Figure 1 showing a reducing valve constructed in one convenient form in accordance with this invention.

Figure 3 shows a modified construction of valve head.

The pressure reducing valve comprises a poppet valve $a$ which is balanced under static conditions due to the fact that the diameter of the valve seat $b$ is equal to the diameter of a portion of the valve stem at $c$ and the inlet branch $d$ delivers to the valve between such seat $b$ and the portion $c$ of the stem of the same diameter as the bore of the seat $b$. The stem has a series of annular grooves $e$ therearound to limit flow along the stem and it moves in a part of the valve housing $f$ which has a restricted leakage hole and passage $g$ therein controlled in cross sectional area by a screw $h$, so that leakage along the stem can in part pass away via the leakage hole and passage, whilst any leakage along the stem which cannot pass through such leakage hole due to its restricted bore, passes into a control chamber of cylinder $i$ in the housing in which a piston $j$ attached to the valve stem moves.

There is a hole $k$ longitudinally through the valve stem leading by radial holes $m$ to radial holes $m^1$ in, and an annular groove $n$ around, the piston. The pressure at $o$ acting via said longitudinal hole $k$, radial holes $m$ and $m^1$, annular groove or recess $n$ nearer the upper end of the piston and the clearance around the piston $j$ produces a pressure in the upper part of the control chamber or cylinder $i$ tending to move the piston in a direction to close the valve $a$ against its seat $b$. This movement is resisted by a spring $p$ acting on the underside of the piston and loaded by the adjustable collar $p^1$. It will be seen therefore that the pressure in the control cylinder or chamber $i$ is that at the valve outlet $o$ except as modified by the influence of the shroud and the leakage rate to atmosphere via the adjustable leakage passage $g$.

Fluid leaking down the valve stem to the passage $g$ and then down the annular space $q$ and fluid leaking along the periphery of the piston $j$ pass away by the connection $t$ at the base of the complete valve casing.

All the principal components of the valve are made of the same metal and changes of temperature therefore cause little differential expansion in the valve and do not affect the functioning of the valve. Frictional forces are reduced to a minimum by the elimination of any piston ring seals, and forces due to hydraulic locking are eliminated by the circumferential grooves round the valve stem.

Under flow conditions, the opening of the valve $a$ would normally depend on the pressure of the spring $p$ and on the outlet pressure, but in order that the flow characteristic may be independent of supply pressure, the opening of the valve is required to be reduced as the supply pressure increases because with increased inlet pressure, there will be an increased flow past the valve $a$, and because of the effect of turbulence and flow, the outlet pressure reflected in the chamber $i$ may not be the true one. This might result in an increase in outlet pressure above the normal figure. The pressure in the chamber $i$ tending to close the valve is therefore augmented by a controlled leakage along the stem $c$ into the chamber $i$. This leakage is controlled by restricting the size of the leakage hole $g$ by the screw $h$. Any high pressure leakage which cannot pass away via the leakage hole passes down the clearance between the valve stem $c$ and the valve housing into the control chamber $i$, thus causing the control chamber pressure to rise above the outlet pressure. Since the leakage down the valve stem from the supply system increases with increasing supply pressure, the leakage overspill and hence the pressure rise in the control chamber also increase with increasing supply pressure. The restriction of the leakage hole is so determined that as the supply pressure rises, the increase of pressure in the control chamber will close the valve $a$ sufficiently to maintain a constant flow characteristic. Under no flow conditions, the increase in the closing force with increasing supply pressure, prevents excessive leakage past the valve seat $b$. Pressure in the control chamber $i$ higher than the outlet pressure can occur because of the pressure drop across the restricted passage around the piston $j$ between the chamber $i$ and passage $n$.

It will be appreciated that under flow conditions, the change of direction of the entering air at $d$ from a radial to an axial direction relative to the valve produces an axial force tending to close the valve. This force increases as the rate of flow increases and would thus cause the outlet pressure to fall excessively at high rates of flow. To overcome this the head of the valve $a$ is enlarged beyond the seat diameter and the head of the valve is shrouded by the casing $u$ connected to the outlet system. Under flow conditions, the restriction between the valve head $a$ and the shroud $u$ produces a pressure differential across the head and this differential acting on the enlargement of the head produces a force tending to open the valve. By suitably proportioning the valve head and by suitably positioning the entrance to the passage $k$ feeding the control chamber, it is possible partially to balance the effects of change of direction of air flow and of spring rate. In some instances, it may be convenient to have the entrance to this passage in the body of the valve instead of in the valve stem.

Sensitive pressure reducing valves are usually inherently unstable, but stability may be induced by restricting the low pressure feedback to the control mechanism. In our improvement, the low pressure feedback to the control chamber $i$ passes from the radial ports $m$, $m^1$ along the annular clearance between the control piston $j$ and the valve housing $f$, and the restriction of this path between the piston and housing is sufficient to stabilize the valve.

In many reducing valve installations, it is required that the system should be non-returnable i. e. that no return flow through the reducing valve should occur when the supply pressure is removed. This feature is usually obtained by placing a non-return valve in series with the reducing valve. Where this "non-return" feature is called for, we make the valve head (as shown in Figure 3) double acting i. e. it closes on the seat $b$ to cut-off the incoming air when the outlet pressure exceeds a predetermined maximum and it closes on a second seat $w$ under the pressure of the before mentioned spring $p$ acting on the piston $j$ when the supply pressure is below the outlet pressure and the outlet pressure is insufficient to overcome the spring $p$. When the valve is on the seat $w$, the entrances to the passage $k$ through the valve and stem, come beneath the part of the valve which seats on the said seat $w$ and are in communication with the air supply branch $d$ so that when the air supply is restored, the pressure acting on the piston $j$ moves the valve on to its seat $b$. Thus when there is no supply of air to the valve, the outlet side of the valve is cut off from the inlet side and from the control piston $j$.

What we claim is:

1. A pressure reducing valve comprising a poppet valve balanced under static conditions due to the diameter of the valve seat being equal to the diameter of a portion of the valve stem and the valve inlet branch delivering between the valve seat and the said portion of the valve stem which has a series of annular grooves therearound where it moves in the valve housing to limit leakage flow along the stem, there being a leakage hole and passage of adjustable effective cross section extending from the stem through the housing to an atmospheric outlet to allow a part of the leakage to escape, the remainder passing along the stem to the upper end of a control cylinder containing a piston on the valve stem and tending to move the valve against spring pressure in a direction to close it, there being a hole longitudinally through the valve stem from its outlet pressure end to radial holes opening into an annular recess around the aforesaid piston nearer its upper end so that a pressure related to the outlet pressure gains access via said longitudinal and radial holes and annular recess and a clearance around the piston to the control cylinder above the piston to tend to close the valve.

2. A pressure reducing valve as claimed in claim 1, in which a shroud is provided around the valve head beyond its seat so that a restriction of flow between valve head and shroud occurs producing a differential pressure across the valve head tending to open the valve.

3. A pressure reducing valve as claimed in claim 2, in which the valve head is double acting and can seat on seats both above and below it, the entrance to the hole longitudinally through the valve stem being below the upper seat when the valve closes thereon and in communication upon such closure with the pressure in the air inlet branch of the valve.

4. A pressure reducing valve as claimed in claim 1, in which the leakage through the leakage hole and passage is to an annular passage between the outside of the control cylinder and the valve casing and so to a venting connection at the base of the said casing.

5. A pressure reducing valve as claimed in claim 1 in which the spring tending to open the valve bears upon the underside of the piston in the control cylinder and is loaded adjustably by a collar beneath.

References Cited in the file of this patent

UNITED STATES PATENTS

| | | |
|---|---|---|
| 404,504 | Ross | June 4, 1889 |
| 815,912 | Eddy | Mar. 20, 1906 |
| 1,386,051 | Dieter | Aug. 2, 1921 |
| 2,192,042 | Hoffmann | Feb. 27, 1940 |
| 2,498,198 | Arthur | Feb. 21, 1950 |